(12) United States Patent
Dai et al.

(10) Patent No.: US 8,983,685 B2
(45) Date of Patent: Mar. 17, 2015

(54) SYSTEM AND METHOD FOR MOVING-BASE RTK MEASUREMENTS

(75) Inventors: Liwen L. Dai, Chino Hills, CA (US); Yunfeng Shao, Torrance, CA (US)

(73) Assignee: Deere & Company, Moline, IL (US)

( * ) Notice: Subject to any disclaimer, the term of this patent is extended or adjusted under 35 U.S.C. 154(b) by 120 days.

(21) Appl. No.: 13/115,851

(22) Filed: May 25, 2011

(65) Prior Publication Data

US 2012/0029810 A1 Feb. 2, 2012

Related U.S. Application Data

(60) Provisional application No. 61/369,596, filed on Jul. 30, 2010.

(51) Int. Cl.
*G01C 21/00* (2006.01)
*G01S 5/00* (2006.01)
*G01C 21/20* (2006.01)
*G01S 19/43* (2010.01)

(52) U.S. Cl.
CPC .............. *G01S 5/0072* (2013.01); *G01C 21/20* (2013.01); *G01S 19/43* (2013.01)
USPC ............... 701/13; 701/25; 701/476; 701/484; 701/492; 701/534; 701/468

(58) Field of Classification Search
CPC ...... G01C 21/00; G01C 21/20; G01S 5/0072; G01S 19/43; G01S 5/00
USPC ............. 701/13, 25, 476, 484, 492, 534, 213, 701/468
See application file for complete search history.

(56) References Cited

U.S. PATENT DOCUMENTS

| 5,148,179 | A | * | 9/1992 | Allison | 342/357.31 |
| 5,311,154 | A | * | 5/1994 | Hirota | 333/26 |
| 5,359,332 | A | | 10/1994 | Allison et al. | 342/357 |
| 5,477,458 | A | * | 12/1995 | Loomis | 701/471 |
| 5,512,905 | A | * | 4/1996 | Nichols et al. | 342/357.27 |

(Continued)

FOREIGN PATENT DOCUMENTS

| CN | 101048671 A | 10/2007 | |
| EP | 0609935 A2 | 8/1994 | G01S 5/00 |

(Continued)

OTHER PUBLICATIONS

"Report on overseas travel", Sep. 2003, Portland, Oregon, ION 2003 Reports.doc, specifically p. 12, "bullet" item 5.

(Continued)

*Primary Examiner* — John R Olszewski
*Assistant Examiner* — Jean-Paul Cass
(74) *Attorney, Agent, or Firm* — Morgan, Lewis & Bockius LLP

(57) ABSTRACT

In a system and method for navigating a moving object according to signals from satellite, a moving object receives satellite navigation signals from a number of satellites. The moving object also receives moving base data from a moving base. The received moving base data includes satellite measurement data of the moving base. At the moving object a relative position vector of the moving object relative to the moving base is determined, based on the received moving base data and the received satellite navigation signals. The moving object sends a signal reporting information corresponding to the relative position vector.

24 Claims, 8 Drawing Sheets

(56) References Cited

U.S. PATENT DOCUMENTS

| | | | |
|---|---|---|---|
| 5,519,620 A * | 5/1996 | Talbot et al. | 701/2 |
| 5,557,524 A * | 9/1996 | Maki | 701/32.4 |
| 5,646,630 A * | 7/1997 | Sheynblat et al. | 342/357.31 |
| 5,757,314 A * | 5/1998 | Gounon et al. | 342/357.34 |
| 5,841,026 A * | 11/1998 | Kirk et al. | 73/178 R |
| 5,850,341 A * | 12/1998 | Fournier et al. | 701/50 |
| 5,899,957 A | 5/1999 | Loomis | 701/214 |
| 5,935,194 A | 8/1999 | Talbot et al. | 701/214 |
| 6,040,798 A | 3/2000 | Kinal et al. | 342/357.01 |
| 6,100,842 A * | 8/2000 | Dreier et al. | 342/357.41 |
| 6,127,968 A * | 10/2000 | Lu | 342/357.31 |
| 6,342,853 B1 | 1/2002 | Kalafus et al. | 342/357.03 |
| 6,469,663 B1 * | 10/2002 | Whitehead et al. | 342/357.31 |
| 6,531,981 B1 * | 3/2003 | Fuller et al. | 342/357.48 |
| 6,753,810 B1 * | 6/2004 | Yang et al. | 342/357.27 |
| 6,792,380 B2 * | 9/2004 | Toda | 702/151 |
| 6,985,104 B2 * | 1/2006 | Large et al. | 342/357.27 |
| 7,043,364 B2 * | 5/2006 | Scherzinger | 701/470 |
| 7,212,155 B2 | 5/2007 | Hatch et al. | 342/357.12 |
| 7,242,211 B2 | 7/2007 | Whetsel | 324/765 |
| 7,298,319 B2 * | 11/2007 | Han et al. | 342/357.27 |
| 7,427,950 B2 | 9/2008 | Eslinger et al. | 342/357.31 |
| 7,511,661 B2 | 3/2009 | Hatch et al. | 342/357.03 |
| 7,656,352 B2 * | 2/2010 | Alban et al. | 342/458 |
| 7,663,539 B2 * | 2/2010 | Han et al. | 342/357.27 |
| 7,679,555 B2 * | 3/2010 | Dai et al. | 342/357.31 |
| 7,855,678 B2 * | 12/2010 | Scherzinger et al. | 342/357.23 |
| 7,991,362 B2 * | 8/2011 | Lane et al. | 455/71 |
| 2005/0024263 A1 * | 2/2005 | Sharpe et al. | 342/357.03 |
| 2005/0110676 A1 | 5/2005 | Heppe et al. | |
| 2005/0151683 A1 * | 7/2005 | Sharpe et al. | 342/357.04 |
| 2005/0248485 A1 * | 11/2005 | Hatch et al. | 342/357.12 |
| 2006/0017611 A1 | 1/2006 | Hatch et al. | |
| 2007/0085737 A1 | 4/2007 | Eslinger et al. | |
| 2008/0309550 A1 * | 12/2008 | Sairo et al. | 342/357.1 |
| 2009/0189805 A1 * | 7/2009 | Sauriol | 342/357.23 |
| 2011/0037647 A1 * | 2/2011 | Tajima et al. | 342/357.26 |
| 2012/0029810 A1 * | 2/2012 | Dai et al. | 701/213 |
| 2013/0234885 A1 * | 9/2013 | Geier et al. | 342/357.23 |

FOREIGN PATENT DOCUMENTS

| | | | | |
|---|---|---|---|---|
| EP | 1580570 A2 | | 9/2005 | G01S 5/14 |
| EP | 204457 | * | 7/2006 | |
| JP | 09061509 A | | 3/1997 | G01S 5/14 |
| WO | WO 2005/114250 A1 | | 12/2005 | |
| WO | WO 2008/035139 A1 | | 3/2008 | |
| WO | WO 2008150389 A1 | * | 12/2008 | G01S 5/14 |
| WO | WO 2009130570 A2 | * | 10/2009 | G01S 5/14 |
| WO | WO 2009/136254 A1 | | 11/2009 | |
| WO | WO 2010074777 A1 | * | 7/2010 | G01S 5/14 |

OTHER PUBLICATIONS

Bona, P., "Precision, Cross Correlation, and Time Correlation of GPS Phase and Code Observations," GPS Solutions, vol. 4, No. 2, pp. 3-13 (2000).

Crawford, S., et al., "Performance Evaluation of Sensor Combinations on Mobile Robots for Automated Platoon Control," ION GNSS 17th Int'l Technical Meeting of the Satellite Division, Sep. 21-24, 2004, Long Beach, California, pp. 706717.

Hatch, R., "Instantaneous Ambiguity Resolution," presented at KIS Symposium 1990, Banff, Canada, Sep. 11, 1990.

Hatch, R., "The Synergism of GPS Code and Carrier Measurements," Magnavox Government and Industrial Electronics Company, Jan. 1982.

Hwang, P.Y., et al., "Enhanced Differential GPS Carrier-Smoothed Code Processing Using Dual Frequency Measurements," Proceedings of the Institute of Navigation (ION) GPS, Sep. 18, 1998, pp. 461-470.

Hwang, P.Y.C., "Kinematic GPS for Differential Positioning: Resolving Integer Ambiguities on the Fly," Navigation: Journal of the Institute of Navigation, vol. 38, No. 1, pp. 1-15, Spring 1991.

International Search Report for International Application No. PCT/US2007/002514, dated Aug. 22, 2007.

International Search Report for International Application No. PCT/US2005/015836, dated Nov. 21, 2005.

International Search Report for International Patent Application No. PCT/US2004/042374, dated Jun. 1, 2005.

Keenan, C.R., et al., "Using the Information from Reference Station Networks: A Novel Approach Conforming to RTCM V2.3 and Future V3.0," IEEE 2002 Position Location and Navigation Symposium, Palm Springs, CA, Apr. 15-18, 2002, pp. 320-322.

Sharpe, Tenny, et al., "Exploiting the Synergies between RTK and Wide Area dGPS Systems", presentation from the Institute of Navigation, 16th International Technical Meeting, Portland, Oregon, Sep. 2003.

Walsh, D., "Real Time Ambiguity Resolution While on the Move," Proceedings of the Institute of Navigation GPS-92, Washington, DC, Sep. 18, 1992, pp. 473-481.

Yang, Y., "Tightly Integrated Attitude Determination Methods for Low-Cost Inertial Navigation: Two-Antenna GPS and GPS/Magnetometer," Dissertation submitted to University of California, Riverside, Jun. 2001.

Navcom Technology, Inc., International Search Report and Written Opinion for International Application No. PCT/US2011/038841, mailed Sep. 14, 2011, 12 pages.

NavCom Tehnology, Inc., 1st Office Action, CN201180047278.9, Jul. 2, 2014, 16 pgs.

* cited by examiner

SYSTEM AND METHOD FOR MOVING-BASE RTK MEASUREMENTS

RELATED APPLICATIONS

This application claims priority to U.S. Provisional Patent Application No. 61/369,596, filed Jul. 30, 2010, "System and Method for Moving-Base RTK Measurements," which is hereby incorporated by reference in its entirety.

TECHNICAL DATA FIELD

The disclosed embodiments relate generally to satellite communications. More particularly, the disclosed embodiments relate to moving-base real-time kinematic (RTK) measurement.

BACKGROUND

Conventional real-time kinematic (RTK) techniques used in many navigation applications such as land and hydrographic surveys are based on the use of carrier phase measurement signals received from a number of satellites. The conventional RTK technique used for navigating a moving object receiver (e.g., a ship, a car, etc.) requires a stationary base receiver (often called the base station) to periodically broadcast its satellite data to the moving object receiver. The moving object receiver compares its own phase measurements with the ones received from the base station, and uses that information plus the position of the base station to determine the position of the moving object receiver. Communications between the base station and the rover receiver can take place via radio communication using allocated frequencies, typically in the UHF band.

SUMMARY

Some embodiments provide a system, computer readable storage medium storing instructions, or a computer-implemented method for navigating a moving object according to signals from satellites. A moving object (also referred to herein as a "rover") receives satellite navigation signals from a number of satellites and generates satellite navigation data for the moving object from the received satellite navigation signals. The moving object also receives moving base data from a moving base. The received moving base data includes satellite measurement data of the moving base. At the moving object a relative position vector (e.g., a vector that connects a position of the moving base to a position of moving object) of the moving object relative to the moving base is determined, based on the received moving base data and the received satellite navigation data. In some embodiments, the moving object reports information corresponding to the relative position vector and/or a current position of the moving object by sending a signal to a home system.

In some embodiments, both the moving base data received from the moving base and the satellite navigation data for the moving object include data for a first specific time (e.g., an epoch) prior to the current time. As described in more detail below, the relative position vector is then determined by generating an RTK value for the relative position vector for the first specific time, using the moving base data received from the moving base and the satellite navigation data for the moving object for the first specific time.

The moving-base RTK method and system described herein can be used in a wide range of applications, such as maintaining a fixed distance between two vehicles (e.g., a moving object such as a rover and a moving base such as a truck) or other mobile systems, maintaining a fixed relative position (e.g., a position difference vector in two-dimensions or three-dimensions) between two vehicles or other systems, or maintaining a fixed velocity difference between two vehicles or other systems.

DESCRIPTION OF EMBODIMENTS

Figure 1:
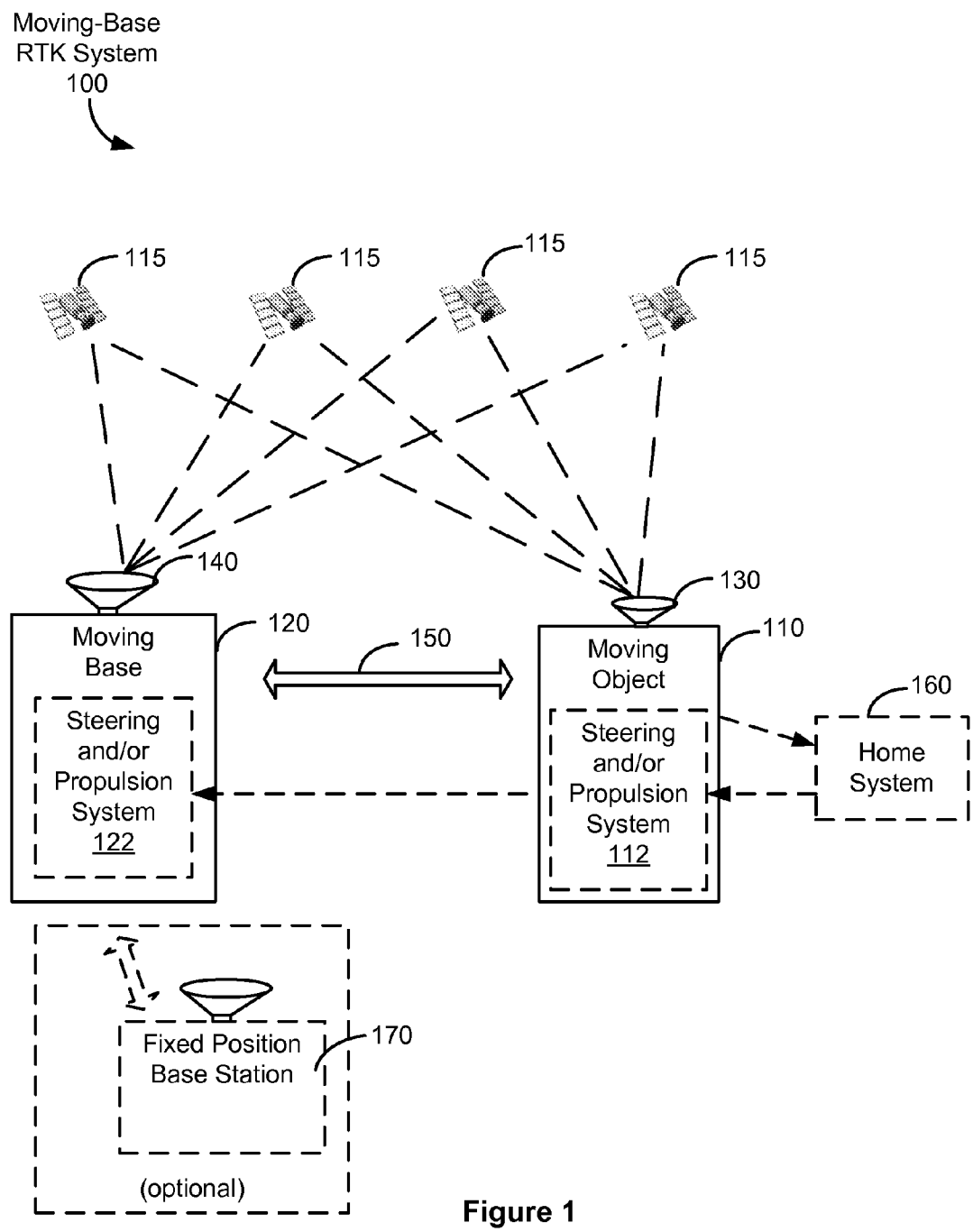
FIG. 1 is a block diagram illustrating moving-base RTK system, according to some embodiments.

FIG. 1 is a block diagram illustrating moving-base RTK system 100, according to some embodiments. Moving-base RTK system 100 enables a moving object 110 (e.g., a rover such as a boat, a robot, a haul, etc.) to determine, at any point of time, its current relative position with respect to a moving base 120 (e.g., a ship, a command vehicle, a truck, etc.), instead of a stationary base that conventional RTK navigation systems use. Moving object 110 and moving base 120 are equipped with satellite receivers, including satellite antennas 130 and 140, respectively, to receive satellite navigation signals from at least four satellites 115. The satellite navigation signals received by moving base 120 and moving object 110 are typically global navigation satellite system (GNSS) signals, such as Global Positioning System (GPS) signals at the 1575.42 MHz L1 signal frequency and the 1227.6 MHz L2 signal frequency.

Moving base 120 measures the received satellite navigation signals at the specific times and communicates those measurements (e.g., pseudorange and/or phase measurements) at certain specific times (e.g., times, $t_0$ to $t_k$, shown in FIG. 3) to moving object 110, using communication channel 150 (e.g., a wireless communication channel, or more specifically a radio communication channel such as a UHF radio). Optionally, moving base 120 determines its position at predefined times (e.g., the same times that the satellite signal measurements are sent, or other times) using the satellite navigation signals received from satellites 115 and communicates its position at those times to moving object 110, using the communication channel 150. However, in many embodiments, communication of the moving base position by moving base 120 to moving object 110 is not necessary.

Moving object 110 determines its relative position with respect to moving base 120, based on (A) satellite navigation signals received by moving object 110 from satellites 115 and (B) the satellite signal measurement data received from moving base 120. The relative position determined by moving object 110 is represented by a relative position vector. In the following discussion, and throughout this document, the term "relative position vector" means the "relative position vector between moving object 110 and moving base 120, or vice versa." It is noted that the relative position vector between moving object 110 and moving base 120 is the same as the relative position vector between moving base 120 and moving object 110, multiplied by minus one. Thus, both relative position vectors convey the same information so long as the starting point and ending point (i.e., which end of the vector at is moving base 120 and which end is at moving object 11) are known.

In some embodiments, moving object 110 is configured to generate a relative position vector for any specified time by 1) determining a relative position vector between moving object 110 and moving base 120 at predefined times or intervals (e.g., at one second intervals), herein called epoch boundary times; and 2) combining the relative position vector at a last epoch boundary time prior to the specified time with the change in position at moving object 110 and the change in position (or the estimated change in position, as explained below) at moving base 120 between the specified time and the prior epoch boundary time. This process, sometimes herein called time synchronized RTK, generates an accurate (e.g., within a few centimeters) relative position vector between moving object 110 and moving base 120 at any specified time that is between epoch boundary times (e.g., the current time, or an earlier time after the last epoch boundary time). In some implementations, a system such as moving object 110 is configured to generate updated relative position vectors at a rate that is greater than or equal to 25 Hz (e.g., an updated relative position vector is generated every 40 milliseconds when the update rate is 25 Hz, or every 20 milliseconds when the update rate is 50 Hz).

In some embodiments, moving object 110 reports a relative position vector and/or a current position of moving object 110 to home system 160. Home system 160 may be a server or a client system (e.g., a desktop, a laptop, a cell phone, a tablet, a personal digital assistant (PDA), etc.). In some embodiments, the home system is located in moving object 110 or moving base 120. Home system 160 is optionally linked to a network such as the Internet. Optionally, home system 160 is configured to control movement of moving object 110 (e.g., by controlling steering and/or propulsion systems 112 of moving object 110), or to control movement of moving base 120 (e.g., by controlling steering and/or propulsion systems 122 of moving base 120) so as maintain a predefined distance or relative position vector between moving base 120 and moving object 110.

Figure 2:
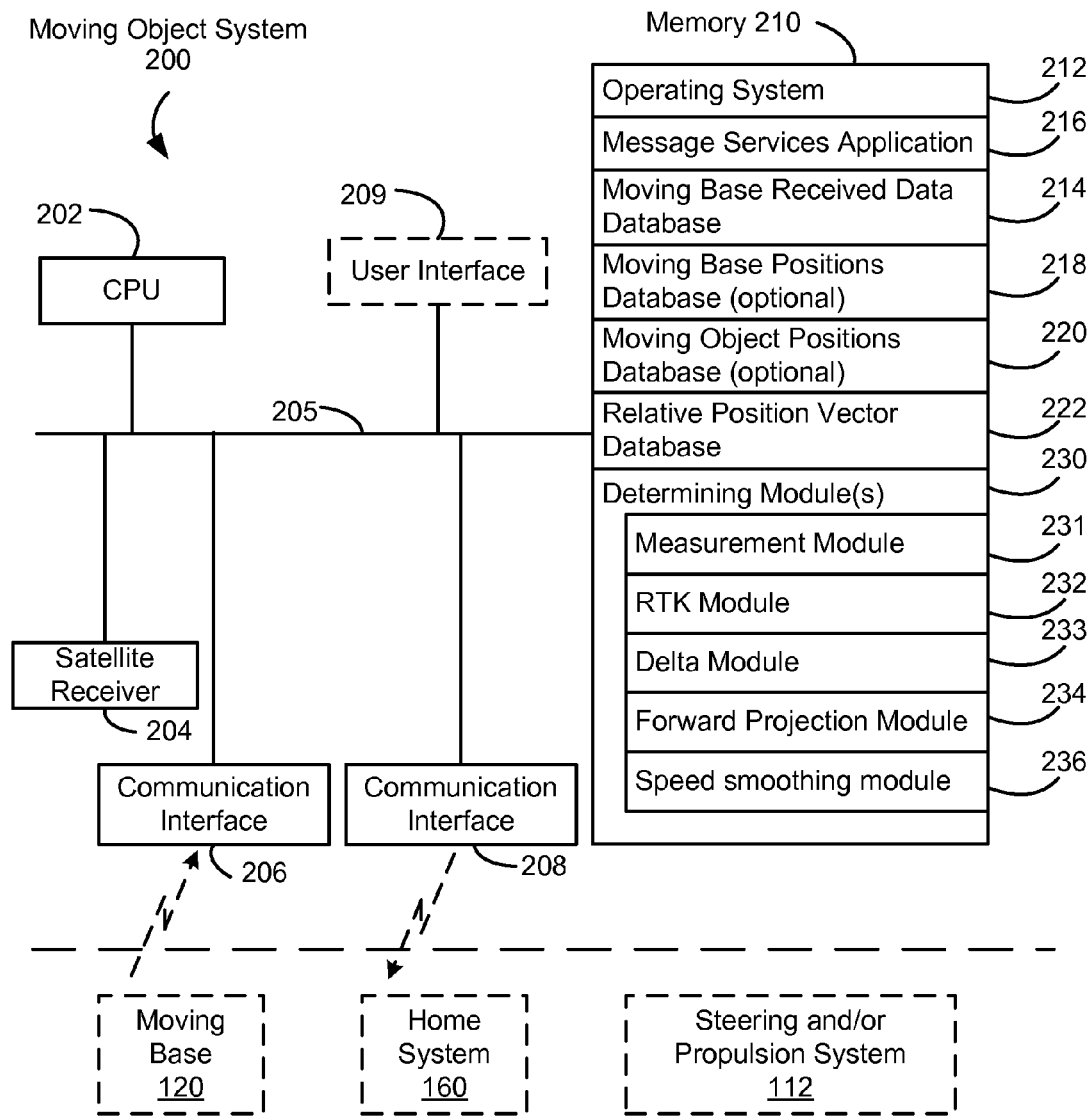
FIG. 2 is a block diagram illustrating a moving object system of the moving-base RTK system of FIG. 1, according to some embodiments.

FIG. 2 is a block diagram illustrating a moving object system 200, corresponding to moving object 110 in the moving-base RTK system 100 of FIG. 1, according to some embodiments. Moving object system 200 typically includes one or more processors (CPU's) 202 for executing programs or instructions; satellite receiver 204 for receiving satellite navigation signals; one or more communication interfaces 206, 208; memory 210; and one or more communication buses 205 for interconnecting these components. Moving object system 200 optionally includes a user interface 209 comprising a display device and one or more input devices (e.g., one or more of a keyboard, mouse, touch screen, keypad, etc.). The one or more communication buses 205 may include circuitry (sometimes called a chipset) that interconnects and controls communications between system components.

Communication interface 206 (e.g., a receiver or transceiver) is used by moving object system 200 to receive communications from moving base 120. Communication interface 208 (e.g., a transmitter or transceiver) is used by moving object system 200 to send signals from moving object 110 to the home system 160, reporting information corresponding to the relative position vector with respect to moving base 120 and/or a current position of moving object 110. In some embodiments, communication interfaces 206 and 208 are a single transceiver, while in other embodiments they are separate transceivers or separate communication interfaces.

Memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 optionally includes one or more storage devices remotely located from the CPU(s) 202. Memory 210, or alternately the non-volatile memory device(s) within memory 210, comprises a computer readable storage medium. In some embodiments, memory 210 or the computer readable storage medium of memory 210 stores the following programs, modules and data structures, or a subset thereof:

- An operating system 212 that includes procedures for handling various basic system services and for performing hardware dependent tasks.
- A database 214 of data received from moving base 120 (as described in more detail below with respect to FIG. 5A).
- Message services applications 216 that operate in conjunction with communication interface 206 (e.g., a receiver or transceiver) to handle communications between moving base 120 and moving object system 200, and communication interface 208 (e.g., a transmitter or transceiver) to handle communications between moving object system 200 and home system 160. In some embodiments, the message services applications 216 include drivers, which when executed by the one or more processors 202, enable various hardware modules in communication interface 206 to receive messages from moving base 120 and in communication interface 208 to send messages to home system 160.
- An optional moving base positions database 218 that stores data associated with positions (e.g., three-dimensional positions) of moving base 120 at a number of specific times, as will be discussed below with respect to FIG. 5B. Database 218 is for applications in which the absolute position of moving base 120 is determined by moving object system 200, or absolute position information is provided by moving base 120.
- An optional moving object positions database 220 that stores data associated with the positions (e.g., three-dimensional positions) of moving object 110 at a number of specific times, as will be discussed below with respect to FIG. 5C. Database 220 is for applications in which the absolute position of moving object 110 is determined by moving object 110 (moving object system 200).
- A relative position vector database 222 that stores data associated with relative position vectors of moving object 110 with respect to moving base 120 at a number of specific times, as will be discussed below with respect to FIG. 6.
- One or more determining modules 230 that when executed by the CPU 202 determine a relative position vector of moving object 110 relative to moving base 120, based on moving base data received from moving base 120 via communications receiver 206 and satellite navigation data received from the satellites 115 by satellite receiver 204 (receiver 130, FIG. 1).

In some implementations, determining modules 230 include an RTK module 232, a delta module 233, a forward projection module 234 and a speed smoothing module 236, as described below.

RTK module 232 determines the relative position vector at specific times (herein called epoch boundary times) using moving base data (i.e., satellite measurement data for moving base 120 at each specific time, as received from moving base 120 at times later than the specific times) and satellite signal measurements made at moving object system 200 (at moving object 110) at each specific time. The computation of the relative position vector at each specific time is performed in accordance with well known real-time-kinematics (RTK) methodologies.

Delta module 233 determines changes in position of moving object 110 (or moving object system 200) between epoch boundary times. In some embodiments, delta module 233 uses a technique known as L1 phase navigation to convert changes in phase measurements of the L1 signal into position changes of moving object 110.

Measurement module 231 processes the received satellite navigation signals to determine satellite navigation data for moving object 110 at a sequence of times, including epoch boundary times and times between the epoch boundary times. This processing involves measuring or determining measurements of the received satellite navigation signals. For example, the measurements may include a pseudorange and L1 and L2 phase measurements for each satellite from which navigation signals are received. RTK module 232 uses the moving base data and the moving object satellite navigation data for a specific time (e.g., an epoch boundary time) to generate an RTK value, which is the relative position vector for that specific time.

Optionally, in applications in which an absolute position of moving object 110 is needed, RTK module 232 determines the position (i.e., absolution position) of moving base 120 at the one or more specific times using the moving base data. Alternatively, the determining module(s) 230 receives data from moving base 120 indicating the position of moving base 120 at the one or more specific times. In these alternative implementations, moving base 120 processes the satellite navigation signals received by its satellite receiver 140 (FIG. 1) to generate absolute position values of moving base for the one or more specific times. The accuracy of the absolute position values generated by moving base 120 may be improved through the use of any of a variety of navigation assistance technologies, such wide area differential GPS or RTK (e.g., using a fixed base station 170, FIG. 1).

Speed smoothing module 236 determines a smoothed velocity of moving base 120, using two or more position-change updates of moving base 120, as discussed below in more detail with respect to FIG. 7.

Forward projection module 234 determines a projected current relative position vector for the current time using a known change in position of moving base 120 since a specific time in the past (e.g., an epoch boundary time), the velocity of moving base 120 (e.g., the smoothed velocity of moving base 120, determined by module 236), a known change in position of moving object 110 since the same specific time in the past, and the relative position vector for that same specific time, to determine a projected current relative position vector for the current time. See equation 1 below and the related discussion.

Operating system 212 and each of the above identified modules and applications correspond to a set of instructions for performing a function described above. The set of instructions can be executed by the one or more processors 202 of moving base system 200. The above identified modules, applications or programs (i.e., sets of instructions) need not be implemented as separate software programs, procedures or modules, and thus various subsets of these modules may be combined or otherwise re-arranged in various embodiments. In some embodiments, memory 210 stores a subset of the modules and data structures identified above. Furthermore, memory 210 optionally stores additional modules and data structures not described above.

FIG. 2 is intended more as functional description of the various features which may be present in a moving object system 200 than as a structural schematic of the embodiments described herein. In practice, and as recognized by those of ordinary skill in the art, items shown separately could be combined and some items could be separated. For example, some items shown separately in FIG. 2 could be combined into a single module or component, and single items could be implemented using two or more modules or components. The actual number of modules and components, and how features are allocated among them will vary from one implementation to another.

Figure 3:
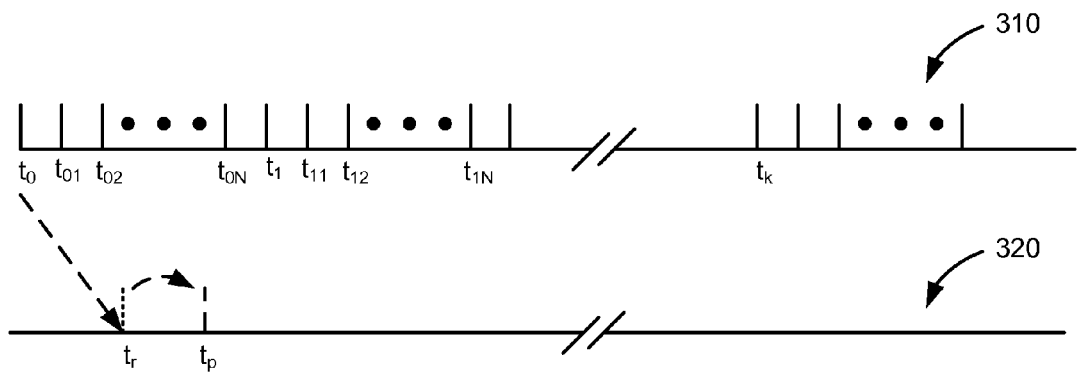
FIG. 3 is a timing diagram illustrating timing of position signals as transmitted from the moving base and received and processed at the moving object, according to some embodiments.

FIG. 3 is a time diagram illustrating timing of signals (moving base data) as transmitted from moving base 120 (FIG. 1) and received and processed at moving object 110 (FIG. 1), according to some embodiments. The top time scale 310 indicates epoch times $t_0, t_1 \ldots t_k$, (each or which is, or closely corresponds to an epoch boundary time) at which moving base 120 transmits data (moving object data, including satellite measurement data) to moving object 110. For example, at time $t_0$ data is transmitted from moving base 120 to moving object 110. The data transmitted at time $t_0$ includes satellite measurement data, which will be used by moving object 110, in conjunction with satellite signal measurements made at moving object 110, to generate a relative position vector that represents the position of moving object 110 relative to moving base 120 at $t_0$. Another set of satellite measurement data is transmitted by moving base 120 to moving object 110 at time $t_1$. In some embodiments, the epoch times $t_0, t_1 \ldots t_k$, occur at one second intervals.

Data transmitted by moving base 120 arrives at moving object 110 at time $t_r$, (see time scale 320) which is sufficiently later than time $t_0$ that the transmission delay, and subsequent processing, must be taken into account in order to generate an accurate relative position vector. Stated another way, because the moving base 120 is moving, and data transmission is not instantaneous, using RTK to determine the relative position vector requires synchronizing the satellite measurement data for moving base 120 and moving object 110, and determining a current relative position vector for the current time requires projecting changes in position of the moving base 120 to the current time. These techniques for managing the timing delays while performing RTK computations is herein called time-synchronized RTK.

RTK module 232 of moving object system 200 determines an RTK value (also referred to as "an RTK solution"), which is the relative position vector between moving object 110 and moving base 120 for each epoch boundary time $t_0, t_1 \ldots t_k$. Determining the RTK solution at moving object 110 uses both the delayed moving base data and measurements determined from the satellite navigation signals received at moving object 110. Using this information, RTK module 232 determines an accurate relative position vector or an accurate position (e.g., within less than or equal to one or a few cm) of moving object 110 for each of the epoch boundary times.

The received time ($t_r$) associated with the data received from moving base 120 is indicated on the time scale 320. As noted above, the time delay between $t_0$ and $t_r$ is due to data transmission between moving base 120 and moving object 110. As a result, the time synchronized RTK process for time $t_0$ starts at $t_r$. However, due to computational delay, the RTK solution may not be ready until a later time $t_p$. In other words, the RTK solution obtained at time $t_p$ actually corresponds to time $t_0$. The satellite navigation data for moving object 110 used in determining the RTK solution for time $t_0$ must correspond to the time $t_0$ and not $t_p$ or $t_r$, and thus the satellite navigation data for time $t_0$ is buffered or stored in a local database until RTK module 232 is ready to use it. Other data transmitted from moving base 120 to moving object 110 (e.g., update data transmitted between epoch boundary times) experiences similar transmission delays, and the processing delays for each type of data will typically depend on the way in which that data is processed.

Update times $t_{01}, t_{02} \ldots t_{0n}$ (e.g., at predetermined time intervals shorter than one second, such as 20 msec intervals corresponding to 50 Hz or 40 msec intervals corresponding to 25 Hz) shown on the time scale 310, correspond to times after the first epoch boundary time $t_0$ (and similarly after other epoch boundary times such as $t_1$ and $t_k$). In some embodiments, moving base 120 transmits a position update at each update time. In one example, the update information transmitted by moving base 120 for each update time indicates changes in position and time, $\Delta x$, $\Delta y$, $\Delta z$, and $\Delta t$, since the immediately preceding epoch boundary time. As explained above, the update information takes a finite amount of time to be received and processed by moving object system 200. Moving object system 200 processes the update information to determine the velocity of moving base 120.

In some embodiments, moving object 110 determines an updated relative position vector (i.e., at current time $t_{0K}$) based on the RTK solution for the last epoch boundary time, such as time $t_0$ (or $t_1 \ldots t_k$). In some embodiments, moving object 110 determines the current relative position vector (e.g., at any of the update times $t_{01}, t_{02} \ldots$ or $t_{0N}$) by combining the RTK solution for the first specific time $t_0$ with relative position changes from both moving base 120 and moving object 110, as represented by Equation 1 below:

$$RPV(t_{0K}) = RPV(t_0) + \Delta pos_{MO} - \Delta pos_{MB} \quad (Eq. 1)$$

where, $RPV(t_{0K})$ and $RPV(t_0)$ represent the relative position vectors at a current time $t_{0K}$ and the earlier epoch boundary time $t_0$, respectively. The relative position changes $\Delta pos_{MO}$ and $\Delta pos_{MB}$ respectively correspond to position change of moving object 110 and moving base 120 between times $t_0$ and $t_{0K}$. The change in position of moving object 110 can be determined "directly" (e.g., using L1 successive delta phase navigation) from measurements of changes in the received satellite navigation signals, or it can be calculated (in which case it is a projected change in position) using well-known methods, based on the velocity of moving object 110 and a travel time of $\Delta t = t_{0k} - t_0$. Further, the velocity of moving object 110 can be determined from changes in position of moving object 110. Due to transmission delay, the current position of moving base 120 cannot be determined directly. Thus, the change in position of moving base 120, $\Delta pos_{MB}$, between times $t_0$ and $t_{0k}$ is calculated from two parts. The first part is the change of the moving base between the time $t_0$ and $t_{0i}$, which is can be is determined "directly" using successive delta phase measurements at the moving base and is then transmitted to the moving object via radio communication. The second part determines a projected change in position of the object base using well-known methods, based on velocity of moving base 120 and a travel time of $\Delta t = t_{0k} - t_{0i}$. See equation 8 below and the related discussion. The velocity of moving base 120 is determined from changes in position of moving base 120; this is discussed in more detail below.

Figure 4:
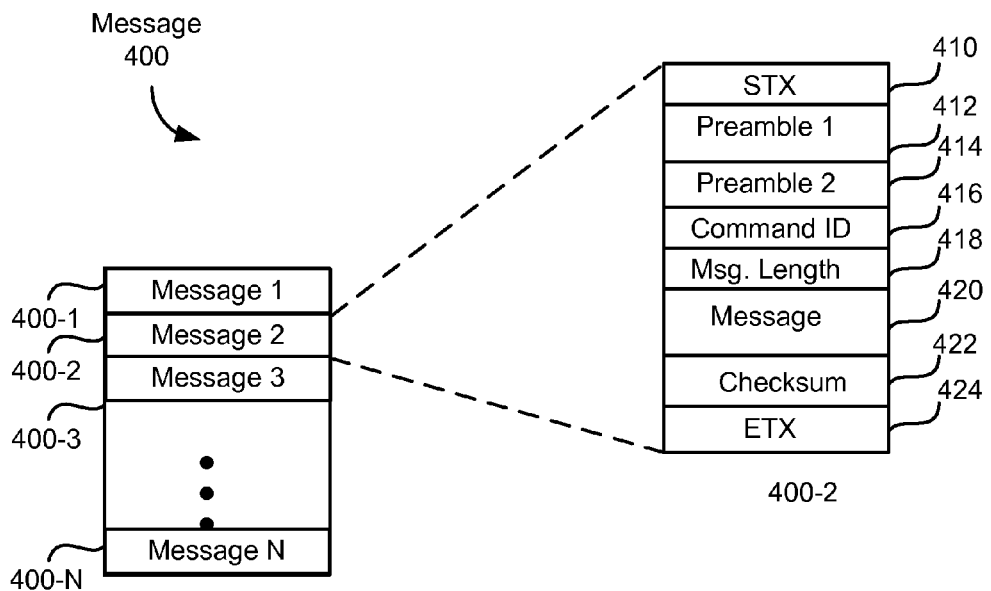
FIG. 4 is block diagram illustrating a data structure of a message database that stores messages communicated in the moving-base RTK system, according to some embodiments.

FIG. 4 is block diagram illustrating a data structure of a message 400 received by moving object 110 from moving base 120, according to some embodiments. The message 400 is one of a sequence of messages 400-1, 400-2, et seq., transmitted by moving base 120. Each received message 400 includes a number of data fields. An exemplary data record structure for a message 400 includes the following data fields:

A STX data field 410 that signifies start of a message and is limited to a certain number of bytes (e.g., 8 bytes);

A preamble 1 data field 412 that includes a first preamble;

A preamble 2 data field 414 that includes a second preamble;

A command ID data field 416 that provides a command identification number. Examples of command ID's include an ID identifying a message containing satellite navigation data for one or more satellites, and ID identifying a message containing position update data;

A message length data field 418 that indicates the length of the message data field 420;

A message data field 420 that stores the body of the message and may include various data (e.g., subfields holding specific types of values) depending on the information being communicated;

A Checksum data field 422 that includes a checksum that can be used to detect errors in the communicated message; and An ETX data field 424 that signifies the end of the message.

In some implementations, when the message 400 is a message containing satellite navigation data for one satellite (e.g., sent at the beginning of an epoch), message data field 420 includes the mobile base 120 identification number (or, more generally, data identifying the mobile base), the satellite PRN number (or, more generally, data identifying the satellite) for which measurement data is being provided in the message, the time associated with the measured satellite signals (e.g., the GPS timestamp value), satellite signal resolution or quality information, a pseudorange from mobile base 120 to the satellite, and carrier phase measurements for one or more satellite signals (e.g., the L1 and L2 signals from a GPS satellite).

In some implementations, when the message 400 is a position update message (e.g., an update message sent at one of the update times $t_{01}, t_{02} \ldots t_{0n}$), message data field 420 includes the mobile base 120 identification number, the time of the update, the delta time for the update (e.g., the amount of time between the update time and the immediate preceding epoch boundary time), delta values for X, Y and Z components of the mobile base's coordinates, number of satellites used by mobile base 120 to generate the position update data, and variance-covariance values for the X, Y and Z delta values.

Figure 5A:
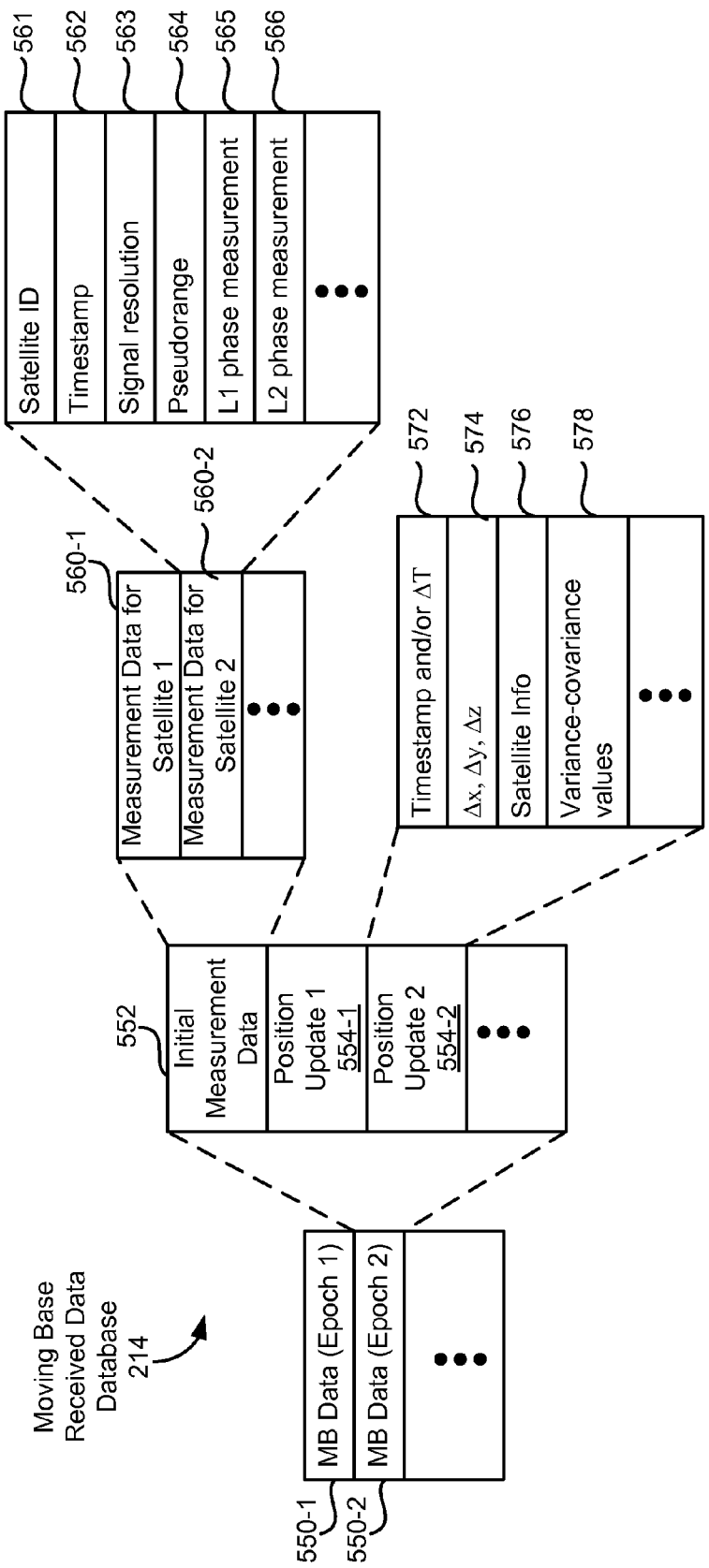
FIGS. 5A-5C are block diagrams illustrating data structures for data received from a moving base, an optional moving base position database, and an optional moving object position database, according to some embodiments.

FIG. 5A depicts a data structure for a database 214 of data received from moving base 120. The database includes data 550 received from moving base 120 for each epoch (e.g., one second intervals). The number of epochs for which data 550 is retained by moving object system 200 may depend on the amount of memory available, the needs of applications that use this information, and so on. Data 550 for a respective epoch include initial measurement data 552 and a sequence of position updates 554. The initial measurement data 552, sent by moving base 120 at the beginning of the epoch, includes measurement data 560 for each of a plurality of satellites. In some embodiments, the measurement data 560 for any one of the satellites includes a satellite identifier 561, a timestamp 562 (e.g., a GPS timestamp indicating the start time of the epoch), one or more signal resolution values to indicate the quality of the satellite signal received at moving base 120, a pseudorange 564 from moving base 120 to the satellite, and L1 and L2 phase measurements. In other embodiments, some of these fields may be omitted or combined, and additional fields may be included. For example, a single timestamp 562 may be provided for all the satellite measurements.

In some embodiments, position update data 554 for a single position update sent by mobile base 120 includes a change in position 574; a timestamp and/or delta time value (indicating an amount of time since the most recent epoch boundary time) 572, indicating the time corresponding to the position update values 574; and optionally includes satellite information 576 (e.g., indicating the number of satellites on which the position update is based), and variance-covariance information.

Figure 5B:
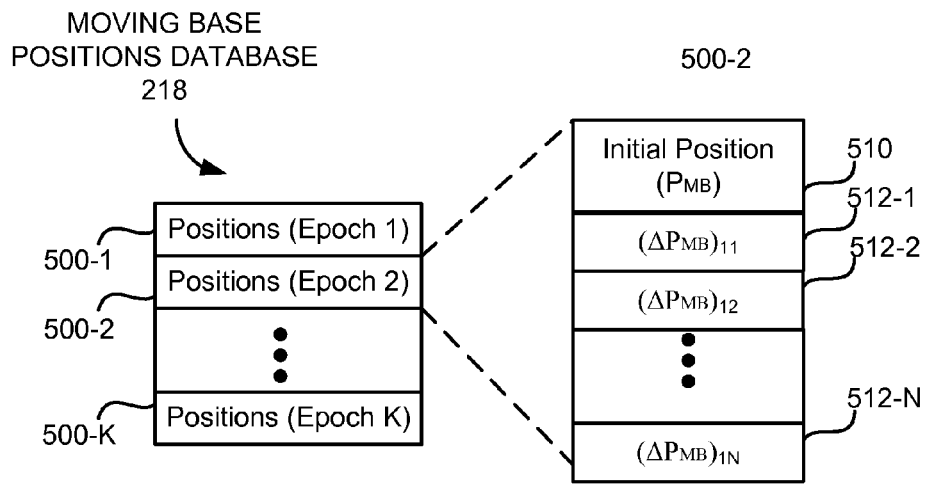
Figure 5C:
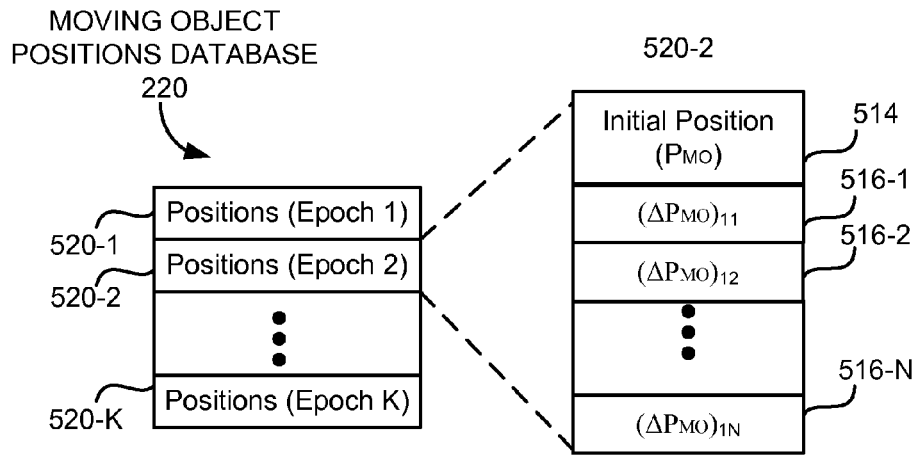

FIG. 5B is block diagram illustrating a data structure of an optional moving base position database 218, and FIG. 5C is a block diagram illustrating a data structure of a moving object position database 220, according to some embodiments. As mentioned above, in implementations in which an absolute position of the moving object 110 is needed, moving object 110 (FIG. 1) optionally receives position information from moving base 120 (FIG. 1) for each of the epoch boundary times $t_0, t_1 \ldots t_k$, in addition to the satellite navigation data sent by moving base 120. In some embodiments, moving object system 200 stores the received position information in data records 500-1 to 500-K of the moving base database 218. The position information stored in a respective data record (e.g., data record 500-2) includes data field 510 storing an initial position $P_{MB}$ of moving base 120 and N position change data fields 512-1 to 512-N storing position changes $(\Delta P_{MB})_{01}, (\Delta P_{MB})_{02} \ldots (\Delta P_{MB})_{0N}$ of moving base 120 for update times $t_{01}, t_{02} \ldots t_{0n}$, respectively.

In each position data record 500, the initial position $P_{MB}$ 510 is the position of the moving base moving base 120 at the beginning of the epoch (i.e., at a epoch boundary time) (e.g., $t_1$ in FIG. 3). The initial position $P_{MB}$ can be derived from the satellite navigation signals received at moving base 120 and communicated to moving object 110 via the communication channel 150 (FIG. 1). Alternatively, the initial position $P_{MB}$ can be derived at moving object 110 from the satellite navigation data sent by moving base 120 to moving object 110 via the communication channel 150.

The position changes (e.g., $(\Delta P_{MB})_{11}, (\Delta P_{MB})_{12} \ldots (\Delta P_{MB})_{1N}$) represent changes of the position of moving base 120 corresponding to update times (e.g., update times $t_{11}, t_{12} \ldots t_{1N}$, shown in FIG. 3) after a specific epoch boundary time (e.g., $t_1$). In some embodiments, the position changes $((\Delta P_{MB})_{11}, (\Delta P_{MB})_{12} \ldots (\Delta P_{MB})_{1N})$ are derived, using well-known methods, at moving base 120 from the received satellite navigation signals, and then communicated to moving object 110 via channel 150 (FIG. 1). In addition, when a position update message is not received by moving object system 200 (e.g., due to noise or other problems), moving object system may optionally "fill in" the missing position update 512 using the velocity of moving base 120, as derived from previously received position information for moving base 120 (e.g., an initial position 510 and one or more of the received position updates 512), and the last known position of moving base 120.

Moving object positions database 220 shown in FIG. 5C stores similar information as moving base positions database 218, described above with respect to FIG. 5B. The positions of moving object 110 stored in data records 520-1 to 520-K correspond to the absolute position of moving object 110 during successive epochs. Each data record (e.g., data record 520-2) includes initial position data field 514 storing an initial position $P_{MO}$ of moving object 110 at the beginning of an epoch, and N position change data fields 516-1 to 516-N storing position changes $((\Delta P_{MO})_{11}, (\Delta P_{MO})_{12} \ldots (\Delta P_{MO})_{1N})$ of moving object 110. In some embodiments, the initial position $P_{MO}$ of moving object 110 is an RTK value computed by RTK module 232 of moving object system 200, using the initial position $P_{MB}$ of moving base 120 received from the moving base moving base 120 (or derived at moving object 110 based on satellite navigation data of moving base 120 received from moving base 120).

The moving object position changes $((\Delta P_{MO})_{11}, (\Delta P_{MO})_{12} \ldots (\Delta P_{MO})_{1N})$ represent changes of the position of moving object 110 corresponding to update times (e.g., update times $t_{11}, t_{12} \ldots t_{1N}$, shown in FIG. 3) after an epoch boundary time (e.g., $t_1$). In some embodiments, these position changes are computed by moving object system 200 (FIG. 2) by applying well-known methods to the received satellite navigation signals.

In some embodiments, forward projection module 234 combines the position of moving base 120 at an epoch boundary time (e.g., $t_1$), the relative position vector $RPV(t_1)$ for the epoch boundary time, and a change in position of moving object 110 to determine a position of the moving object 110 at a current time (e.g., an update time $t_{1K}$), as represented by Equation 2 below:

$$P_{MO}(t_{1K}) = P_{MB}(t_1) + RPV(t_1) + (\Delta P_{MO})_{1K} \qquad (\text{Eq. 2})$$

where, $P_{MO}(t_{1k})$ represents position of moving object 110 at update time $t_{1K}$, $P_{MB}(t_1)$ represents the position of moving base 120 at an epoch boundary time $t_1$, $RPV(t_1)$ indicates the relative position vector at the epoch boundary time $t_1$, and $(\Delta P_{MO})_{1K}$ is the change in position of moving object 110 between the epoch boundary time $t_1$ and the update time $t_{1K}$.

Figure 6:
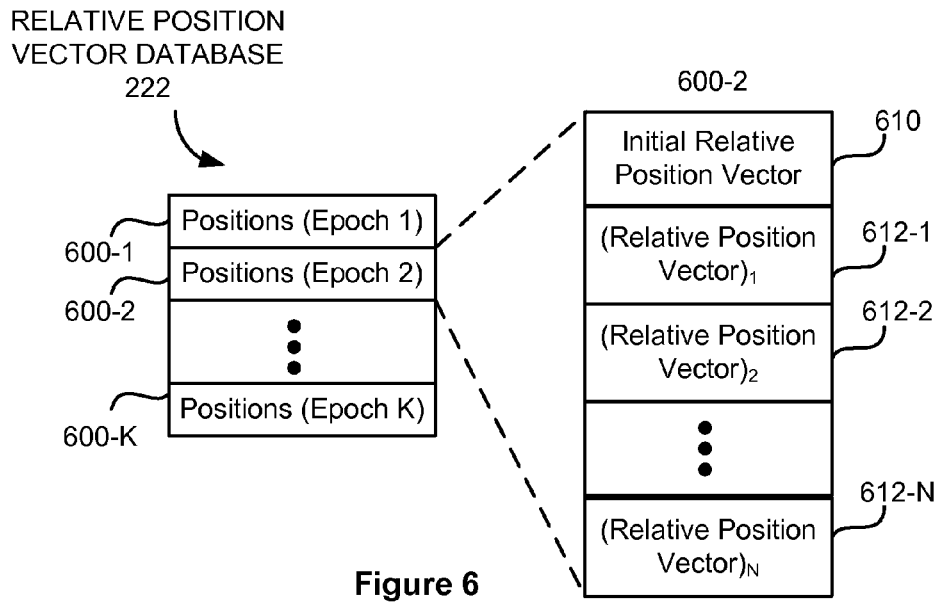
FIG. 6 is block diagram illustrating a data structure of a relative position vector database, according to some embodiments.

FIG. 6 is block diagram illustrating a data structure of a relative position vector database 222, in moving object system 200, according to some embodiments. The relative position vectors stored by moving object system 200 in data records 600-1 to 600-K of the database 222 correspond to successive epochs. In some embodiments, each of these data records 600 includes an initial data field 610 and N update data fields 612-1 to 612-N as shown in FIG. 6. The initial data field 610 stores an initial relative position vector $RPV(t_1)$ determined for the epoch boundary time at the beginning of a respective epoch (e.g., epoch boundary time $t_1$, at the beginning of epoch 2). In some embodiments, the initial relative position vector $RPV(t_1)$ is determined by determination module 230 (FIG. 2) using the satellite navigation data received from moving base 120 for the epoch boundary time $t_1$ and measurements of the satellite navigation signals received by moving object 110 at the same epoch boundary time $t_1$. The relative position vector represents the difference in positions of the moving object and moving base, as represented by Equation 3:

$$RPV(t_1) = P_{MO}(t_1) - P_{MB}(t_1) \qquad (\text{Eq. 3})$$

where, $P_{MO}(t_1)$ is the position of moving object 110 at time $t_1$, and $P_{MB}(t_1)$ is the position of moving base 120 at time $t_1$. Data fields 612-1 to 612-N store update values for the relative position vector corresponding to update times $t_{11}, t_{12} \ldots t_{1N}$ after the epoch boundary time $t_1$. In some embodiments, relative position vector $RPV(t_{11})$ for update time $t_{11}$ is determined by moving object system 200 in accordance with Equation 4:

$$RPV(t_{11}) = RPV(t_1) + \Delta pos_{MO} - \Delta pos_{MB} \qquad (\text{Eq. 4})$$

where, $RPV(t_1)$ is the initial relative position vector at the epoch boundary time $t_1$, and $\Delta pos_{MO}$ and $\Delta pos_{MB}$ are the respective changes in positions of moving object 110 and moving base 120 between the epoch boundary time $t_1$ and a respective update time $t_{11}$.

Figure 7A:
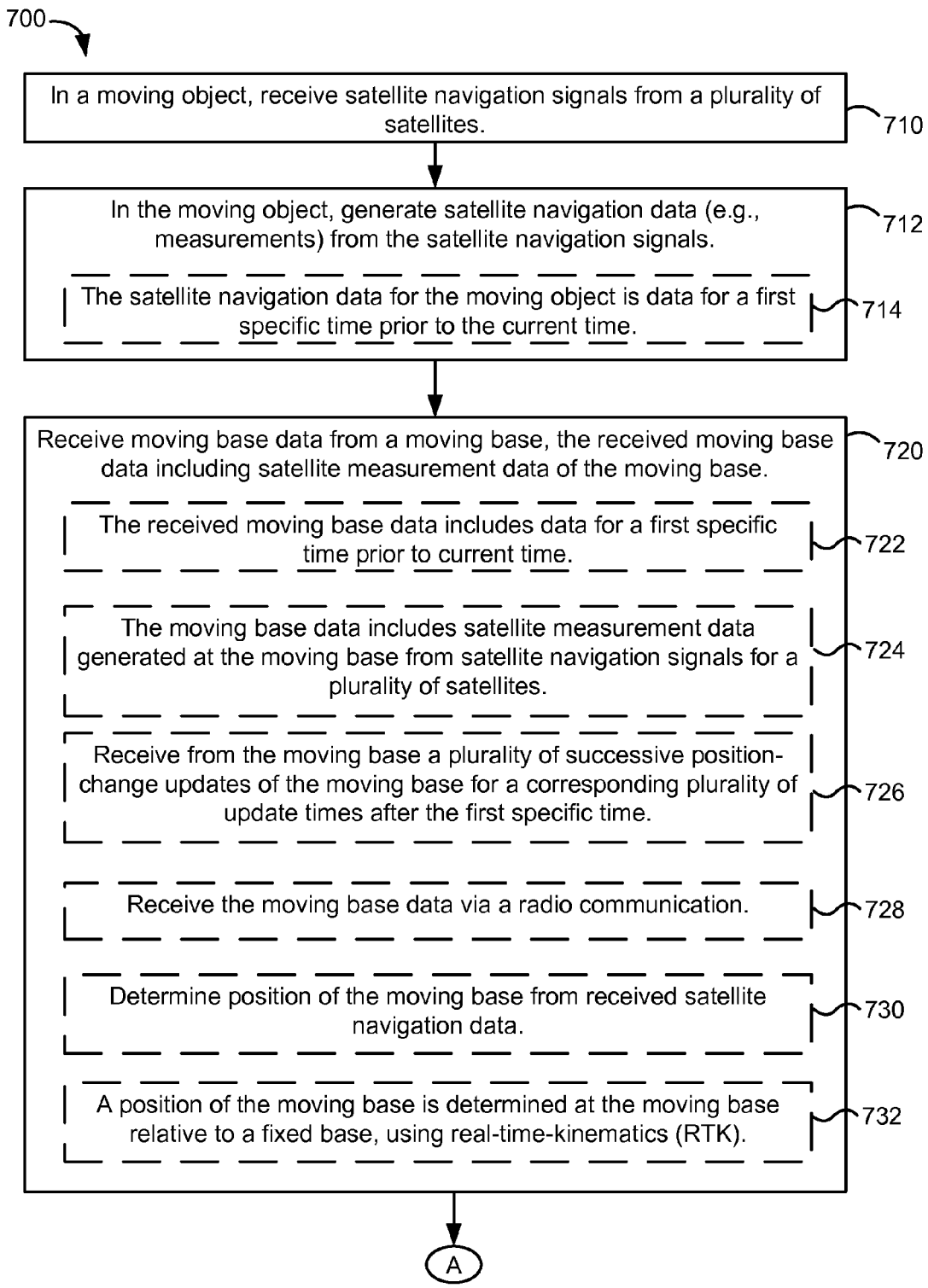
FIGS. 7A-7C are flowcharts of a method for moving-base RTK measurement, according to some embodiments.
Figure 7B:
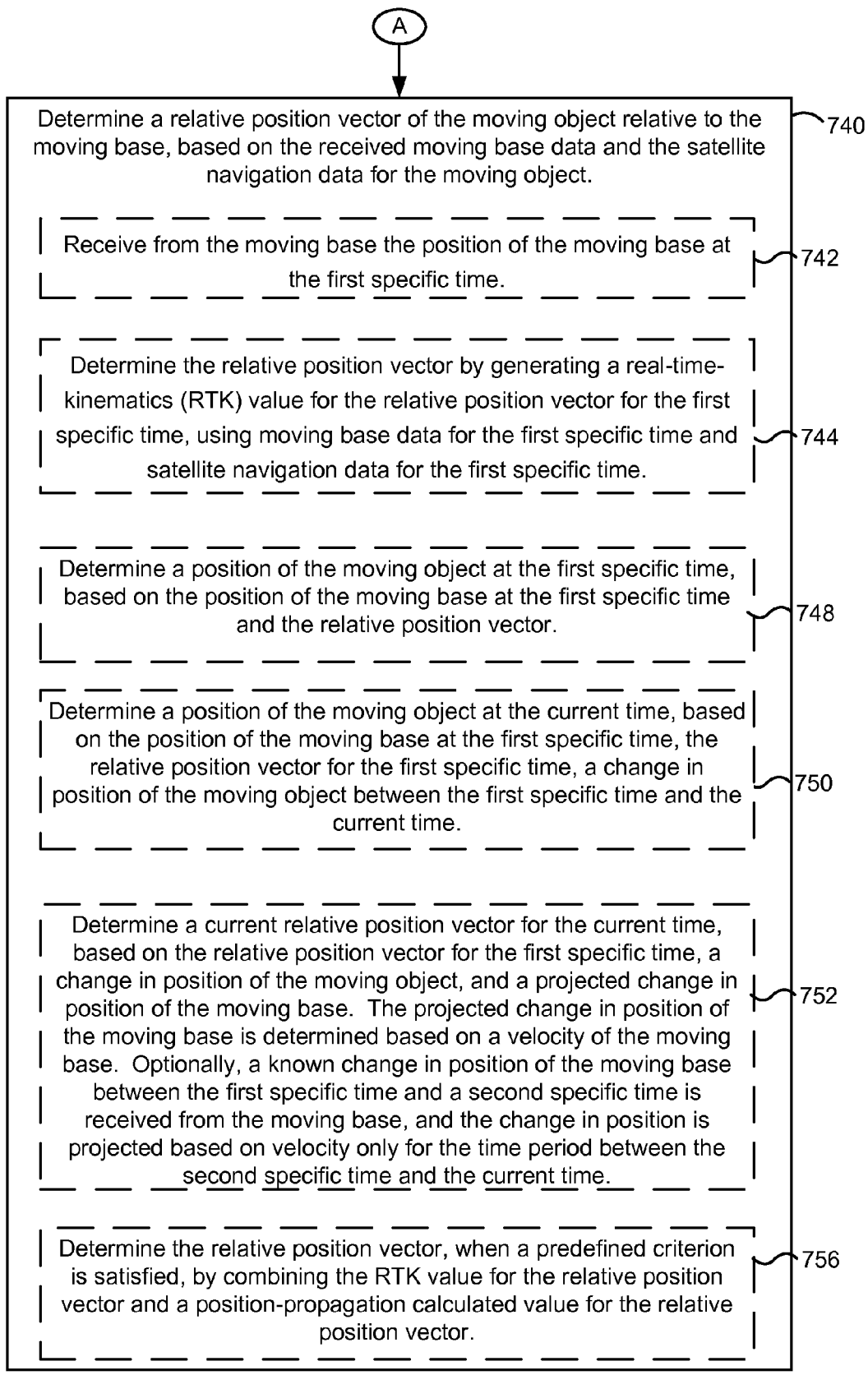
Figure 7C:
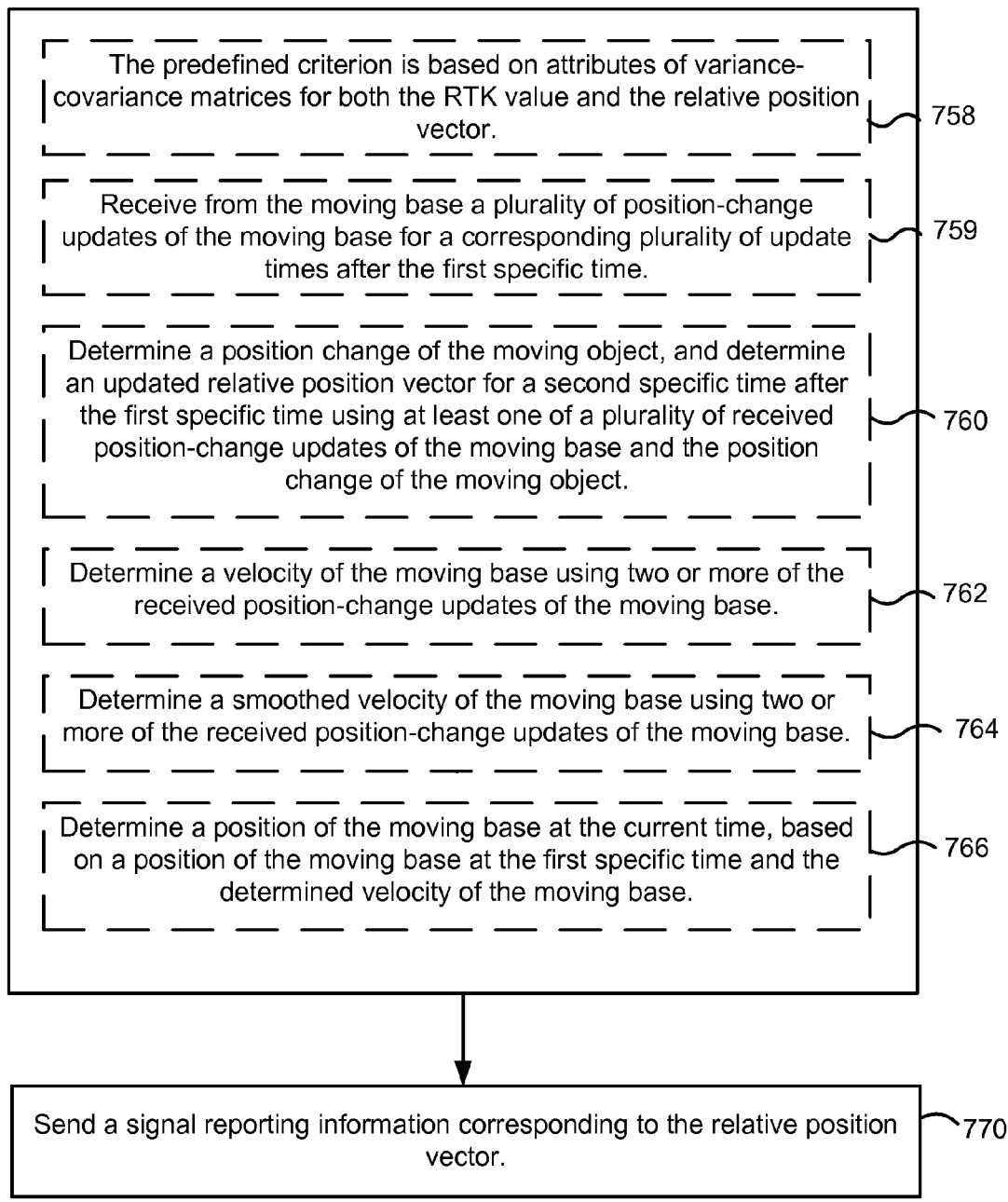

FIGS. 7A-7C depict a flowchart of a method 700 for generating relative position vectors (also called baseline vectors), for a sequence of times, representing the relative position of a moving object 110 relative to a moving base, in accordance with some embodiments. Method 700 may be implemented by moving object system 200, under the control of instructions stored in memory 210 (FIG. 2) that are executed by one or more processors (202, FIG. 2) of moving object system 200. Each of the operations shown in FIGS. 7A-7C corresponds to computer readable instructions stored in a computer readable storage medium of memory 210 in moving object system 200. The computer readable instructions are in source code, assembly language code, object code, or other instruction format that is interpreted and/or executable by the one or more processors of moving object system 200.

Moving object system 200 (FIG. 2) receives (710), via the satellite receiver 204 (FIG. 2), satellite navigation signals from satellites 115 (FIG. 1). The satellite navigation signals are measured, or processed to produce measurements, to produce satellite navigation data for moving object 110 (712). In one example, the satellite navigation data for moving object 110 includes, for each satellite from which satellite navigation signals are received, a pseudorange measurement and phase measurements for one or more satellite signals, such as the GPS L1 and L2 signals. For example, the satellite navigation data for moving object 110 corresponds to an epoch boundary time (714) (e.g., any of times $t_0, t_1 \ldots t_k$ shown in FIG. 3).

Subsequently (720), moving object 110 receives, via communication channel 150 and communications receiver 206 (FIG. 2), moving base data from moving base 120 (FIG. 1). The received moving base data correspond to an epoch boundary time (e.g., any of times $t_0, t_1 \ldots t_k$ shown in FIG. 3) prior to the current time (722).

The moving base data includes satellite measurement data of moving base 120 (724). The satellite measurement data is generated by moving base 120 from the satellite navigation signals is receives from a number of satellites 115 (724). Examples of the specific information included the satellite measure data received from moving base 120 are described above with reference to FIGS. 4 and 5A.

In some embodiments, moving object 110 receives from moving base 120 a number of successive position change updates of moving base 120 (726). The successive position change updates correspond to a number of update times (e.g., update times $t_{11}, t_{12} \ldots t_{1N}$ after the epoch boundary time $t_1$) after the last epoch boundary time (e.g., $t_1$) for which satellite measurement data has been received from moving base 120. Moving object 110 receives the successive position change updates via communications channel 150 and communications receiver 206 (728), and stores them in the moving base received data database 214, as described above with respect to FIG. 5A.

Optionally, an absolute position (as opposed to a relative position) of moving base 120 is determined by determining module 230 of moving object system 200 (FIG. 2), using the satellite navigation data received from moving object system 200 (730). For example, the position of moving base 120 is determined for an epoch boundary time (e.g., $t_0$ or $t_1$). Alternatively, moving base 120 determines its position relative to a fixed base using RTK and transmits the determined position to moving object system 200 via communication channel 150 (732). The position of moving base 120 is determined relative to the fixed base in implementations that require highly accurate measurements of the position of moving base 120 and/or moving object 110. In yet other implementations, a position of moving base 120 is determined at moving base 120 using the best positioning solution available at the moving base. For example, the best available positioning solution may be selected by the moving base from a set of two or more solutions selected from the group consisting of: a standalone solution, a Wide Area Augmentation System solution, a global differential positioning solution, and a real-time-kinematics (RTK) solution.

Determining module 230 of moving object system 200 determines a relative position vector of moving object 110 relative to moving base 120 (740). Determining module 230 uses the satellite navigation data received from moving base 120 and satellite navigation data received from the satellites 115 to determine the relative position vector.

In some embodiments, RTK module 232 determines (744) the relative position vector by generating an RTK value for the relative position vector (i.e., sometimes called the RTK solution) for an epoch boundary time (e.g., time $t_0$ shown in FIG. 3). RTK module 232 uses the moving base satellite navigation data for the epoch boundary time $t_0$ received with delay at time $t_r$ (FIG. 3) and the satellite navigation data corresponding to the epoch boundary time $t_0$ to determine the RTK solution. In some embodiments, while determining the relative position vector, RTK module 232 compares its own phase measurements of satellite navigation signals received at moving object 110 with the moving base satellite navigation data received from moving base 120.

Optionally, determining module 230 (at moving object 110) determines the position $P_{MO}(t_0)$ of moving object 110 for an epoch boundary time (e.g., $t_0$), based on the position $P_{MB}(t_0)$ of moving base 120 for the epoch boundary time and the value of the relative position vector $RPV(t_0)$ at the same epoch boundary time (748), as represented by Equation 5:

$$P_{MO}(t_0) = P_{MB}(t_0) + RPV(t_0) \quad \text{(Eq. 5)}$$

In some embodiments, determining module 230 determines the position $P_{MO}(t_{01})$ of moving object 110 at the current time $t_{0k}$ (750), based on the position $P_{MB}(t_0)$ of moving base 120 at the preceding epoch boundary time $t_0$, the relative position vector for the preceding epoch boundary time $t_0$ and the change in position of moving object 110, as represented by Equation 6:

$$P_{MO}(t_{01}) = P_{MB}(t_0) + RPV(t_0) + \Delta P_{MO}(t_{01} - t_0) \quad \text{(Eq. 6)}$$

where $RPV(t_0)$ represents the relative position vector for the epoch boundary time $t_0$ and $\Delta P_{MO}(t_{01} - t_0)$ represents the change in position of moving object 110 between the current time and the epoch boundary time.

In some embodiments, if the moving object system 200 fails to receive satellite navigation signals for any particular time at which it needs to measure those signals, for example due to the moving object system 200 moving near or under an obstruction, moving object system 200 "bridges" over the data missing period. Moving object system 200 accomplishes this by extrapolating the moving object system's position, or change in position. In particular, moving object system 200 computes a velocity $V_{MO}$ of moving object system 200, for example by using computations analogous to the computations described below for determining a velocity of moving base 120. Then a change in position $\Delta P_{MO}$ of moving object system 200 for the data missing period is computed by multiplying the determined velocity $V_{MO}$ by the length of the data missing period $\Delta t$.

In some embodiments (752), determining module 230 determines the relative position vector $RPV(t_{0k})$ for the current time $t_{0k}$ based on the relative position vector $RPV(t_0)$ for the epoch boundary time $t_0$, the change in position $\Delta P_{MO}(t_{0k}-t_0)$ of moving object 110, and a projected change in the position $\Delta P_{MB}(t_{0k}-t_0)$ of moving base 120, which is determined based on the velocity of the moving base moving base 120, as represented by Equations 7 and 8:

$$RPV(t_{0k})=RPV(t_0)+\Delta P_{MB}(t_{0k}-t_0)-\Delta P_{MO}(t_{0k}-t_0) \quad (Eq. 7)$$

where $\Delta P_{MB}(t_{0k}-t_0)$ is partially projected using the velocity of moving base 120 because current moving base 120 delta position is not available at moving object 110 due to communication delays. For example, if time $t_{0i}$ is the last time for which a position update has been received from moving base 120, $\Delta P_{MB}(t_{0k}-t_0)$ may be computed as follows:

$$\Delta P_{MB}(t_{0k}-t_0)=\Delta P_{MB}(t_{0i}-t_0)+V_{MB}\cdot(t_{0k}-t_{0i}) \quad (Eq. 8)$$

where $(t_{0k}-t_{0i})$ is the elapsed time between the current time and the last update time for which a moving base update has been received by the moving object, and $V_{MB}$ is the velocity of moving base 120. Stated more generally, when the moving object has received one or more updates from the moving base since the last epoch boundary time, the computation of the relative position vector for the current time takes into account (A) the change in position of the moving base from a first specific time (the last epoch boundary time) to a second specific time (the last time for which an update is received from the moving base), and (B) a projected change in position of the moving base from the second specific time to the current time. The change in position $\Delta P_{MO}(t_{0k}-t_0)$ of moving object 110 is determined by moving object system 200 from changes in the satellite navigation signals received by satellite receiver 204 of moving object system 200.

In some embodiments, a position-propagation calculated value is determined for the relative position vector at an epoch boundary time (e.g., time $t_1$, or more generally $t_J$) when a predefined criterion is satisfied (756). As discussed below, the predefined criterion corresponds a computation whose result indicates low confidence in the RTK solution. $RPV_{PP}$, the position-propagated value for the relative position vector for an epoch boundary time (e.g., $t_J$) is determined by using $RPV(t_0)$, the relative position vector for a prior specific time (e.g., $t_0$), $\Delta P_{MO}$, the change in position of moving object 110, and $\Delta P_{MB}$, the change in position of the moving base moving base 120, in the time interval (e.g., one second) between the current epoch boundary time (e.g., $t_J$) and the prior epoch boundary time (e.g., $t_0$), as represented by Equation 9:

$$RPV_{PP}=RPV(t_0)+\Delta P_{MB}-\Delta P_{MO} \quad (Eq. 9)$$

Furthermore, when the predefined criterion is met, the determining module 230 determines the relative position vector for epoch boundary time $t_J$ by combining the RTK value for the relative position vector with the position-propagation calculated value for the relative position vector (i.e., $RPV_{PP}$), as represented by Equation 10:

$$RPV=RPV_{RTX}+R_{RTK}\cdot(R_{RTK}+R_{PP})^{-1}\cdot(RPV_{PP}-RPV_{RTK}) \quad (Eq. 10)$$

where $R_{RTK}$ and $R_{PP}$ represent the variance-covariance matrices for the RTK solution (i.e., $RPV_{RTK}$) and the position-propagated value (i.e., $RPV_{PP}$), respectively. In some embodiments, when the predetermined criteria is not met, the relative position vector for an epoch boundary time is defined by the RTK solution (i.e., $RPV_{RTK}$). Equation 10 represents a weighted sum of the RTK value and the position-propagation calculated value for the relative position vector. In this weighted sum, the factor $R_{RTK}\cdot(R_{RTK}+R_{PP})^{-1}$ in Equation 10 is the weight assigned to the position-propagation calculated value for the relative position vector and $1-R_{RTK}\cdot(R_{RTK}+R_{PP})^{-1}$ is the weight assigned to the RTK value for the relative position vector.

In some embodiments, the predefined criterion is based on attributes of the variance-covariance matrices for the RTK solution and the position-propagated value (758). For instance, the criterion may be considered met, when the sum of the diagonal elements in the $R_{RTK}$ matrix is larger than the sum of the diagonal elements in the $R_{PP}$ matrix.

In some embodiments, the determining module 230 can determine $RPV(t_1)$, an updated relative position vector for an update time at an epoch boundary time (e.g., $t_1$) based on one or more position-change updates, such as $\Delta P_{MB}(t_{0J})$ received from moving base 120 (e.g., at an update time $t_{0J}$ of update times $t_{01}, t_{02} \ldots t_{0N}$ shown in FIG. 3) and a position change $\Delta P_{MO}$ of moving object 110 between the preceding epoch boundary time and the update time $t_{0J}$, as represented by Equation 11:

$$RPV(t_1)=RPV(t_{0J})-\Delta P_{MB}+\Delta P_{MO} \quad (Eq. 11)$$

where, $RPV(t_{0J})$ is the relative position vector determined for the update time $t_{0J}$ (based on $\Delta P_{MB}(t_{0j})$ and the change in position of moving base 120 between update time $t_{0J}$ and the preceding epoch boundary time $t_0$), $\Delta P_{MO}$ is the change in position of moving object 110 between time $t_1$ and the update time $t_{0J}$, and $\Delta P_{MB}$ is defined in terms of $\Delta P_{MB}(t_{0j})$, as represented by Equation 12:

$$\Delta P_{MB}=(\Delta P_{MB}(t_{0j}))\cdot(t_1-t_{0J})/(t_{0J}-t_0) \quad (Eq. 12)$$

In some embodiments, the determining module 230 determines the velocity of moving base 120 based on two or more position changes of moving base 120 received from moving base 120 (762), as represented by Equation 13:

$$V_{MB}=(\Delta P_{MB}(t_J-t_0)-\Delta P_{MB}(t_{J-1}-t_0))/(t_J-t_{J-1}) \quad (Eq. 13)$$

where, $\Delta P_{MB}(t_J-t_0)$ and $\Delta P_{MB}(t_{J-1}-t_0)$ are the respective position changes of moving base 120 received at moving object 110 for update times $t_1$ and $t_{J-1}$ relative to an epoch boundary time $t_0$. In some embodiments, the update times $t_J$ and $t_{J-1}$ are two of the specific times after the epoch boundary time $t_0$.

Since the velocity of moving base 120 used, for example, in Equation 8 may be quite noisy, in some embodiments speed smoothing module 236 (FIG. 2) determines a smoothed velocity of moving base 120 (764), based on historic information (e.g., two or more position changes of moving base 120), as represented by Equation 14:

$$V_{MB}^S(t_J) = \frac{1}{c}V_{MB}(t_J) + \frac{c-1}{c}V_{MB}^S(t_{J-1}) \quad (Eq. 14)$$

where $V_{MB}^S(t_J)$ is the smoothed velocity of moving base 120 for time $t_J$, $V_{MB}^S(t_{J-1})$ is the smoothed velocity of moving base 120 for a previous time $t_{J-1}$, $V_{MB}(t_J)$ is the unsmoothed velocity (e.g., determined using Equation 13) of moving base 120 for time $t_J$, and c is a smoothing constant. Smoothing constant c is typically between 2 and 10, and more generally it is between 2 and 50. In some embodiments, the value of the smoothing constant c depends on the observed dynamics of the moving base velocity changes and can be any number larger than one.

In some embodiments, the determining module 230 determines $P_{MB}(t_{01})$, the projected position of moving base 120 at the current time $t_{01}$ based on $P_{MB}(t_0)$, the position of moving base 120 at the epoch boundary specific time $t_0$ and the velocity $V_{MB}$, of moving base 120 (as determined in accordance with equation 13 or 14) (766), as represented by Equation 15:

$$P_{MB}(t_{01})=P_{MB}(t_0)+V_{MB}\cdot(t_{01}-t_0)\qquad\text{(Eq. 15)}$$

where $(t_{01}-t_0)$ is the elapsed time between the current time and the epoch boundary time.

Moving object system 200 (FIG. 2) transmits a signal (e.g., using communication interface 208) to home system 160 (FIG. 1) to report information corresponding to the relative position vector and/or the position of moving object 110 to the home system 160.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A method for navigating a moving object according to signals from satellites, the method comprising:

in a moving object,
receiving satellite navigation signals from a plurality of satellites;
generating satellite navigation data for the moving object from the received satellite navigation signals for a first specific time prior to a current time, wherein the moving object comprises a first system that includes a first receiver and a first transmitter;
receiving moving base data from a moving base that is moving and separated from the moving object, wherein the moving base comprises a second system that includes a second receiver and is configured to receive the satellite navigation signals and to transmit the moving base data, the received moving base data including satellite measurement data of the moving base for the first specific time;
determining a relative position vector of the moving object relative to the moving base for the first specific time, and between the moving object and the moving base, based at least in part on a real-time-kinematic (RTK) value for the relative position vector at the first specific time generated based on the received moving base data for the first specific time and the satellite navigation data for the moving object for the first specific time;
determining a current relative position vector for the current time at least in part by combining the RTK value for the relative position vector at the first specific time and a propagated relative position vector, the propagated relative position vector comprising a position-propagation calculated value for the current relative position vector; and
sending, via the first transmitter of the moving object, a signal reporting information corresponding to the current relative position vector.

2. The method of claim 1, wherein the moving base data comprises satellite measurement data generated at the moving base from satellite navigation signals for a plurality of satellites;

the method further comprising determining, in the moving object, a position of the moving base at the first specific time based on the moving base data.

3. The method of claim 2, further comprising determining a position of the moving object at the first specific time, based on the position of the moving base at the first specific time and the relative position vector.

4. The method of claim 2, further comprising determining a position of the moving object at the current time, based on the position of the moving base at the first specific time, the relative position vector at the first specific time, and a change in position of the moving object between the first specific time and the current time.

5. The method of claim 1, further comprising calculating the position-propagation calculated value based on a change in position of the moving object from the first specific time to the current time, a change in position of the moving base between the first specific time and a second specific time, and a projected change in position of the moving base between the second specific time and the current time, wherein the projected change in position of the moving base is based on a determined velocity of the moving base.

6. The method of claim 1, wherein the current relative position vector is based on attributes of a variance-covariance matrices for both the RTK value and the propagated relative position vector.

7. The method of claim 1, further comprising receiving from the moving base a plurality of successive position-change updates of the moving base for a corresponding plurality of update times after the first specific time.

8. The method of claim 7, further comprising determining a position change of the moving object, and determining an updated relative position vector for a second specific time after the first specific time based on a position change of the moving object between the first specific time and the second specific time and at least one additional position-change update of the plurality of received position-change updates of the moving base.

9. The method of claim 7, further comprising determining a smoothed velocity of the moving base based on two or more of the received position-change updates of the moving base.

10. The method of claim 7, further comprising determining a velocity of the moving base based on one or more of the received position-change updates of the moving base.

11. The method of claim 10, further comprising determining a position of the moving base at the current time, based on a position of the moving base at the first specific time and the determined velocity of the moving base.

12. The method of claim 1, wherein receiving the moving base data comprises receiving the moving base data via a radio communication.

13. A system for navigating a moving object according to signals from satellites, the system comprising:
one or more processors;
a satellite receiver to receive satellite navigation signals from a plurality of satellites;
a receiver to receive moving base data from a moving base that is moving and separated from a moving object, the received moving base data including satellite measurement data of the moving base for a first specific time prior to a current time;
memory storing a determining module to be executed by the one or more processors, the determining module to:
generate satellite navigation data for the moving object from the received satellite navigation signals for the first specific time, wherein the moving object comprises a first system that includes a first receiver and a first transmitter, and the moving base comprises a second system that includes a second receiver and is configured to receive the satellite navigation signals and to transmit the moving base data;

determine a relative position vector of the moving object relative to the moving base for the first specific time, and between the moving object and the moving base, based at least in part on a real-time-kinematic (RTK) value for the relative position vector at the first specific time generated based on the received moving base data for the first specific time and the satellite navigation data for the moving object for the first specific time;

determine a current relative position vector at least in part by combining the RTK value for the relative position vector at the first specific time and a propagated relative position vector, the propagated relative position vector comprising a position-propagation calculated value for the current relative position vector; and the first transmitter to send a signal reporting information corresponding to the current relative position vector.

14. The system of claim 13, wherein the determining module further includes instructions to determine, in the moving object, a position of the moving base at the first specific time based on the moving base data.

15. The system of claim 14, wherein the determining module further includes instructions to determine a position of the moving object at the first specific time, based on the position of the moving base at the first specific time and the relative position vector.

16. The system of claim 14, wherein the determining module further includes instructions to determine a position of the moving object at the current time, based on the position of the moving base at the first specific time, the relative position vector at the first specific time, at a change in position of the moving object between the first specific time and the current time.

17. The system of 13, wherein the determining module further includes instructions to calculate the position-propagation calculated value based on a change in position of the moving object from the first specific time to the current time, a change in position of the moving base between the first specific time and a second specific time, and a projected change in position of the moving base between the second specific time and the current time, wherein the projected change in position of the moving base is based on a determined velocity of the moving base.

18. The system of claim 13, wherein the current relative position vector is based on attributes of a variance-covariance matrices for both the RTK value and the propagated relative position vector.

19. The system of claim 13, wherein the receiver receives from the moving base a plurality of successive position-change updates of the moving base for a corresponding plurality of update times after the first specific time.

20. The system of claim 19, wherein the determining module further includes instructions to determine a position change of the moving object, and to determine an updated relative position vector for a second specific time after the first specific time based on a position change of the moving object between the first specific time and the second specific time and at least one additional position-change update of the plurality of received position-change updates of the moving base.

21. The system of claim 19, wherein the determining module further includes instructions to determine a smoothed velocity of the moving base based on two or more of the received position-change updates of the moving base.

22. The system of claim 21 wherein the determining module further includes instructions to determine a position of the moving base at the current time, based on a position of the moving base at the first specific time and the determined velocity of the moving base.

23. A non-transitory computer readable storage medium storing including instructions that, when executed by one or more processors of a system for navigating a moving object according to signals from satellites, perform a method comprising:

receiving satellite navigation signals from a plurality of satellites;

generating satellite navigation data for the moving object from the received satellite navigation signals for a first specific time prior to a current time, wherein the moving object comprises a first system that includes a first receiver and a first transmitter;

receiving moving base data from a moving base that is moving and separated from the moving object, wherein the moving base comprises a second system that includes a second receiver and is configured to receive the satellite navigation signals and to transmit the moving base data, the received moving base data including satellite measurement data of the moving base for the first specific time;

determining a relative position vector of the moving object relative to the moving base for the first specific time, and between the moving object and the moving base, based at least in part on a real-time-kinematic (RTK) value for the relative position vector at the first specific time generated based on the received moving base data for the first specific time and the satellite navigation data for the moving object for the first specific time;

determining a current relative position vector for the current time at least in part by combining the RTK value for the relative position vector at the first specific time and a propagated relative position vector, the propagated relative position vector comprising a position-propagation calculated value for the current relative position vector; and sending, via the first transmitter of the moving object, a signal reporting information corresponding to the current relative position vector.

24. A method for navigating a moving object according to signals from satellites, the method comprising:

in a moving object,
receiving satellite navigation signals from a plurality of satellites;

generating satellite navigation data for the moving object for a first specific time prior to a current time from the received satellite navigation signals, wherein the moving object comprises a first system that includes a first receiver and a first transmitter;

receiving, for the first specific time, moving base data from a moving base that is moving and separated from the moving object, wherein the moving base comprises a second system that includes a second receiver and is configured to receive the satellite navigation signals and to transmit the moving base data, the received moving base data including satellite measurement data of the moving base for the first specific time;

determining a relative position vector of the moving object relative to the moving base for the first specific time, and between the moving object and the moving base, wherein determining the relative position vector comprises generating a real-time-kinematic (RTK)

value for the relative position vector at the first specific time, based on the received moving base data and the satellite navigation data for the moving object;

receiving from the moving base position update data representing a change in position of the moving base between the first specific time and a second specific time;

determining a current relative position vector for the current time, based on the relative position vector for the first specific time, a change in position of the moving object from the first specific time to the current time, the change in position of the moving base between the first specific time and the second specific time, and a projected change in position of the moving base between the second specific time and the current time, wherein the projected change in position of the moving base is based on a determined velocity of the moving base; and sending, via the first transmitter of the moving object, a signal reporting information corresponding to the current relative position vector.

* * * * *